(12) United States Patent
Chen et al.

(10) Patent No.: US 7,007,020 B1
(45) Date of Patent: Feb. 28, 2006

(54) DISTRIBUTED OLAP-BASED ASSOCIATION RULE GENERATION METHOD AND SYSTEM

(75) Inventors: Qiming Chen, Sunnyvale, CA (US); Jie Deng, Fremont, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 519 days.

(21) Appl. No.: 09/524,140

(22) Filed: Mar. 10, 2000

(51) Int. Cl.
*G06F 17/30* (2006.01)

(52) U.S. Cl. .................... 707/6; 705/7; 705/10; 706/6; 706/12; 706/45

(58) Field of Classification Search .................... 707/6, 707/3, 2; 705/8, 10, 7; 395/1; 706/6, 12, 706/45
See application file for complete search history.

(56) References Cited

U.S. PATENT DOCUMENTS

| | | | | |
|---|---|---|---|---|
| 5,615,341 A | * | 3/1997 | Agrawal et al. | 705/10 |
| 5,946,683 A | * | 8/1999 | Rastogi et al. | 707/6 |
| 5,978,788 A | * | 11/1999 | Castelli et al. | 707/1 |
| 5,978,796 A | * | 11/1999 | Malloy et al. | 707/3 |
| 5,983,222 A | * | 11/1999 | Morimoto et al. | 707/6 |
| 6,049,797 A | * | 4/2000 | Guha et al. | 707/6 |
| 6,061,682 A | * | 5/2000 | Agrawal et al. | 707/6 |
| 6,092,064 A | * | 7/2000 | Aggarwal et al. | 707/6 |
| 6,182,070 B1 | * | 1/2001 | Megiddo et al. | 707/1 |
| 6,185,549 B1 | * | 2/2001 | Rastogi et al. | 706/45 |
| 6,272,478 B1 | * | 8/2001 | Obata et al. | 706/12 |
| 6,301,575 B1 | * | 10/2001 | Chadha et al. | 707/2 |
| 6,311,179 B1 | * | 10/2001 | Agarwal et al. | 707/2 |
| 6,317,735 B1 | * | 11/2001 | Morimoto | 707/2 |
| 6,424,967 B1 | * | 7/2002 | Johnson et al. | 707/101 |

FOREIGN PATENT DOCUMENTS

EP 742524 A2 * 11/1996

OTHER PUBLICATIONS

Conjoint Analysis Definition, Aug. 12, 2002 <www.dsrresearch.com/conjoint>.*
DBLab Meetings—p. 12, "Data Cube: Its Implementation and Application in Data Mining" Jun. 26, 1997.*
"High Performance Data Mining Using DataCubes On Parallet Computers", Northwestern University, 1997.*
Qiming et al (A Distributed OLAP Infrastructure for E-Commerce); 1999; IEEE Computer Society.*

* cited by examiner

*Primary Examiner*—Romain Jeanty

(57) ABSTRACT

A distributed OLAP-based method and system for generating association rules. An architecture is provided for processing transaction data to generate summary information, customer profiles, and association rules. The distributed system includes at least two layers of data warehouse/OLAP stations: local data-warehouse OLAP stations (LDOSs) and a global data-warehouse OLAP station (GDOS). The LDOSs perform local data mining and summarization, and the GDOS merges, mines, and summarizes the input data received from LDOSs. The summarized data is then utilized by the GDOS to generate association rules that can be provided to the LDOSs for business planning.

29 Claims, 7 Drawing Sheets

DISTRIBUTED OLAP-BASED ASSOCIATION RULE GENERATION METHOD AND SYSTEM

FIELD OF INVENTION

The present invention relates to data processing systems and more particularly relates to a distributed OLAP-based association rule generation method and system.

BACKGROUND OF THE INVENTION

In the past several years, there has been a rise in the number of mass-merchandise retailers that have many geographically distributed stores that typically span across cities, states, and countries. With this increase in mass retailers, there has been an increase in the use by these retailers of networked computer systems for continuously collecting transaction data related to purchases. In this regard, merchants currently face the problem of data overload and are seeking for ways to convert this storehouse of data into intelligent information about its customers that can be used for business information.

Since transaction data stems from daily purchases, returns, and exchanges that are inputted at all the cash registers of all the stores, millions of records can accumulate very quickly. There is an ever increasing need for the merchants to interpret the data and garner information regarding the customers' buying habits, and use this information to improve its own business decisions. For example, one use of this vast storehouse of data to generate rules that describe past buying trends. Once these past buying trends are determined, business plans related to inventory and promotion can be devised accordingly.

Ways to use this data to generate for business planning is also becoming increasingly important in the world of electronic commerce, where transactions are done on-line (e.g., through the Internet) and involve customers that are located worldwide.

It is desirable to have rules that summarize the buying patterns of the customers. One such type of rule that reflects customers' buying habits is referred to as cross-sale association rules. Cross-sale association rules describe the relationship of the sales of one item to the sales of another item. These cross-sale association rules are quite beneficial to both merchants and customers. For the merchants, such a cross-sale association rule can help the merchant to plan which products to offer together to better meet historical demand. For customer, it is less likely that a desired product will be out-of-stock or that a separate trip to another store is needed to purchase a related product because the current merchant does not carry that particular product.

There have been attempts to generate association rules that reflect customer behavior. Unfortunately, these systems are very limited in several respects. First, these systems narrowly define what is considered a transaction. For example, a single transaction is defined as those products that are purchased and listed in a single receipt. Only those products that are listed on the same receipt are considered to be "associated," and only these products that are on the same receipt are tallied and counted for generation of association rules.

As can be appreciated, there are many transactions that should contribute to the association rules, but instead are not captured by these prior art systems because of this narrow definition. Consider an association rule that is designed to answer the question, how many customers who bought a TV also bought a VCR. The prior art system would count only those customers who bought both a TV and a VCR in a single transaction that used a single receipt. If the same customer went to the same store one day after he purchased a TV to purchase a VCR, this customer would not be counted since the purchases did not occur in a single transaction. Even if a customer actually purchased the TV and VCR at the same time, but utilized two different credit cards or requested two separate receipts for some reason, those purchases would not contribute to the association rule because the purchases are on two separate receipts. Accordingly, it would be desirable for a mechanism that captures more transactions that contribute to associate rules, thereby generating association rules that more accurately reflect reality.

It can be appreciated that the accuracy of such association rules depends on access to all the available information and the capture of all transactions relevant to that rule. Accordingly, it is desirable to generate these association rules based on as large a collection of transaction data that may be gathered at multiple distributed sites as possible. Unfortunately, in order to do so requires that hundreds of millions of transaction records be processed daily. Understandably, there are substantial challenges to current systems and approaches to process association rules.

One challenge is to provide continuous rather than one-time value to e-commerce. Prior art data mining efforts are focused on analyzing historical data. In reality, however, data is being continuously collected, and it is preferable to have a mechanism that mines data continuously to dynamically detect trends arid changes in real-time. For instance, prior art methods are limited to generating a cross-sale association rule that describes the relationship of the past sales of one item to the sales of another item. While such relationships are helpful in making planning and promotion decisions, the changes in cross-sale associations may be even more significant, since such changes usually reflect real-time trends, the reaction to a promotion, or the cause of sales drops or rises. Unfortunately, the prior art systems are unable to reflect such changes in cross-sale associations.

For example, suppose the sales of VCRs had been strongly associated with the sales of TVs, but this association has recently weakened as TV buyers turned to buying DVDs instead of VCRs. Such a change in the association helps explain or predict the slow down of VCR sales. As another example, the association of sales of PCs and a specific brand of printers becoming weaker may imply that customers turned to buying another brand of printers. Accordingly, it is desirable to have a mechanism to catch such dynamic association relationships.

A second challenge is how to enable a conventional system, which is configured to process small amounts of data, to process very large data sets. In a conventional shopping network, a huge volume of transaction records must be processed everyday, and it is unlikely that centralized processing will yield satisfactory results. The scalability issue becomes more critical in the provision of real-time data mining service described above. In order to scale-up, a mechanism is needed to distribute data processing, reduce data volumes at each local site by summarization, and mine data incrementally at multiple levels of aggregation. Unfortunately, the prior art does not provide a way to perform these tasks on very large data sets.

Accordingly, there remains a need for a system and method for generating association rules that more accurately reflects reality, that can provide more flexible and powerful information, and that overcomes the challenges and disadvantages set for previously.

SUMMARY OF THE INVENTION

In one embodiment, an architecture that includes multiple Local Data-warehouse/OLAP Stations (LDOS), and a Global Data-warehouse/OLAP Station (GDOS) is provided. Each LDOS mines transaction data, summarizes the local transaction data and local customer behavior patterns. The GDOS mines the local transaction data provided by the LDOSs, summarizes the local transaction data and generates global customer behavior patterns. An OLAP-based global computation engine is provided at the GDOS for performing these tasks. The OLAP-based global computation engine also includes a scoped association rule generation module, an association rule having conjoint items generation module, and functional association rule generation module for generating association rules that can be expressed as multidimensional and multilevel cubes.

DETAILED DESCRIPTION OF THE PRESENT INVENTION

1. An apparatus and method for a distributed and cooperative data warehousing, OLAP, and data mining system is disclosed. In the description that follows, various terms such as processors, servers, OLAP, data warehousing, mining, cubes, and association rules are used. These are the common terms used by those skilled in the art of data warehousing and OLAP to convey their ideas to each other. Although examples are given where commands from a particular language are utilized, it is noted that the implementation of the present invention is not limited to a particular programming language, as those skilled in the art can readily determine the appropriate language that is best suited for their specific application.

2. System Architecture

Figure 1:
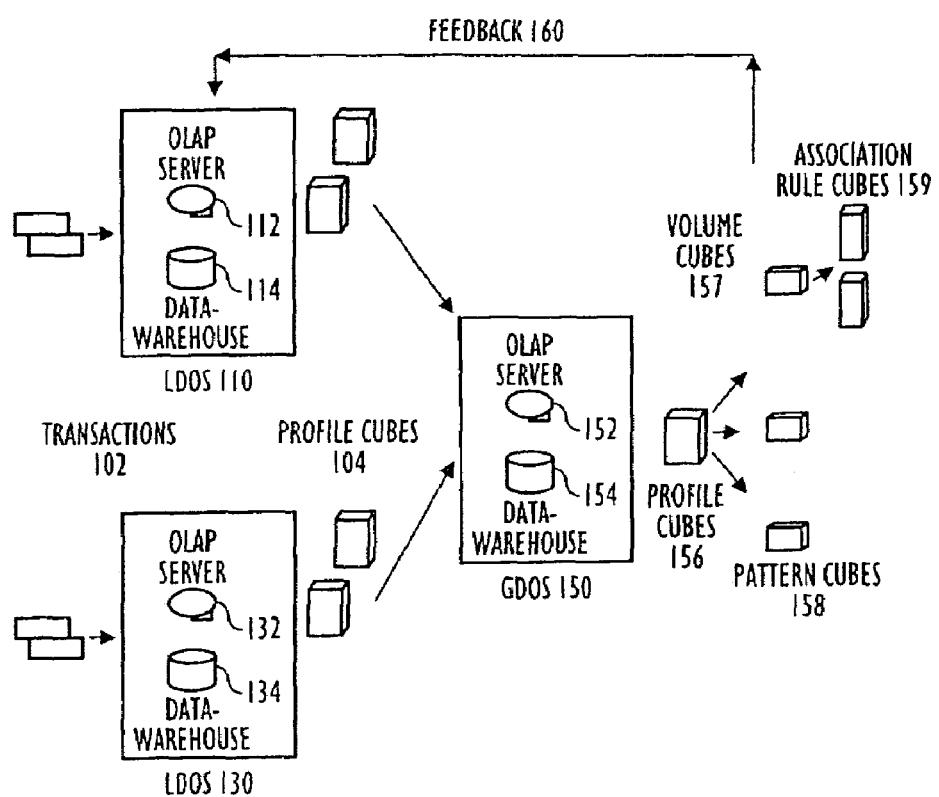
FIG. 1 is a block diagram of a distributed data warehouse/OLAP-based system according to one embodiment of the present invention.

FIG. 1 is a block diagram illustrating a data processing system configured in accordance with one embodiment of the present invention. The distributed and cooperative system of the present invention may be implemented with a minimum of two layers of data warehouse/OLAP stations: LDOSs and a GDOS. It is of course readily feasible for those skilled in the art to structure the system with multiple levels of data warehouses based on the teaching of the present invention. The LDOSs are responsible for local data mining and summarization, while the GDOS is responsible for merging and mining the input data from LDOSs, and for providing the mining results to LDOSs for business applications such as personalized promotions, inventory management, etc.

LDOS 110, 130

A local data warehouse 114, 134, and one or more OLAP servers 112, 132, are maintained in each LDOS 110, 130. The basic input data to an LDOS are transactions 102 that are fed in daily and dumped to archive after use. The basic output data sent to the GDOS 150 periodically from an LDOS 110, 130, is a Profile Snapshot Cube 106 (PSC), which contains partial information for customer profiling. Transaction data and related reference data are stored in the warehouse. Each OLAP server 112, 132, includes a local transaction computation engine, which is described in greater detail with reference to FIGS. 2 and 3, for building and incrementally updating PSC, by mining new transactions flowing into the local data warehouse 114, 134, and for deriving patterns for local analysis. Loading transaction data 102 into the data warehouse 114, 134, and then loading the warehoused data to the OLAP server 112, 132, for generating PSCs 104 can be a periodical process (e.g. hourly or daily).

Besides feeding PSCs 104 to the GDOS 150 periodically, an LDOS 110, 130, also receives data mining results, such as global association rules 159 or alerts, as feedback 160 from the GDOS 150. The LDOS 110, 130 can access the GDOS 150 to get association rules and customer profiles when necessary.

Figure 2:
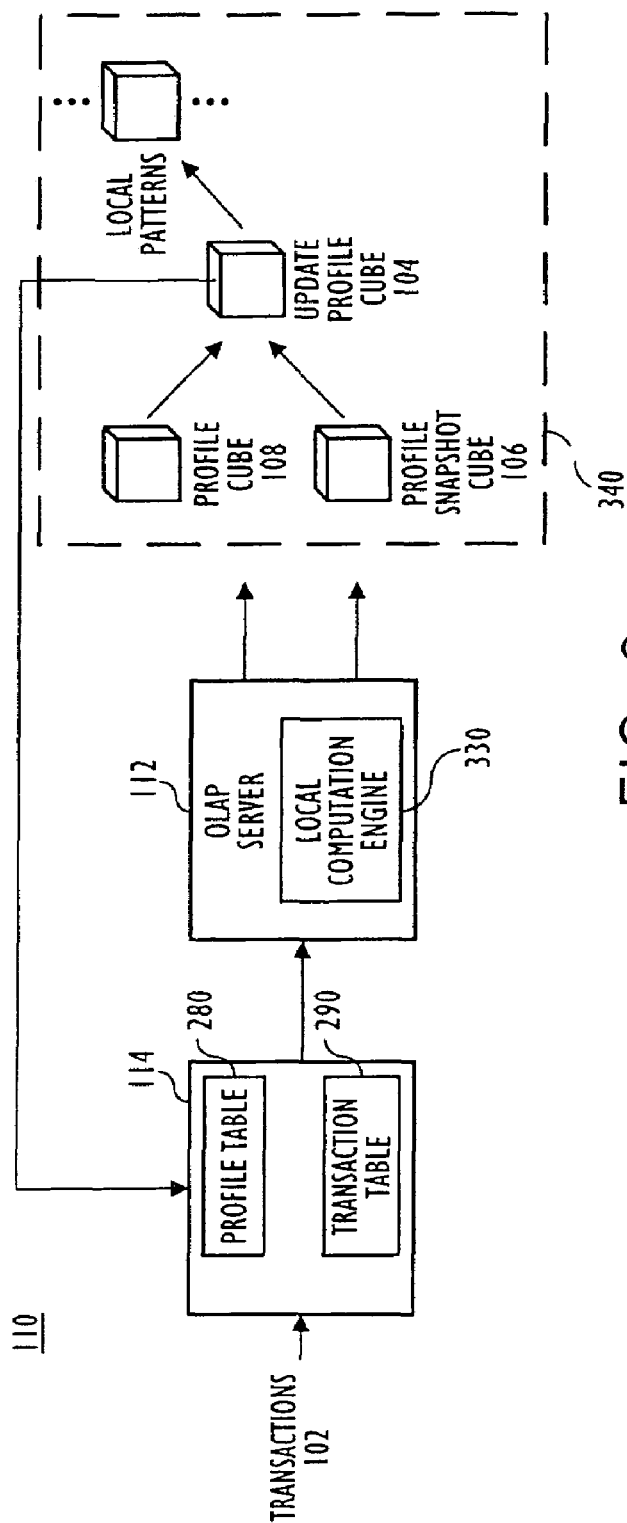
FIG. 2 illustrates in greater detail the LDOS of FIG. 1.

FIG. 2 is a block diagram illustrating the LDOS 110 of FIG. 1. The LDOS 110 includes a data warehouse 114, an OLAP server 112 that has a local computation engine 330, and a multi-dimensional database 340. The present invention powerfully extends the function of a traditional OLAP server 112 by providing the local computation engine 330. In the preferred embodiment, the local computation engine 330 of the present invention is an OLAP-based profile engine. As will be described in greater detail hereinafter with reference to FIG. 3, the OLAP-based local computation engine 330 of the present invention provides a scalable engine for delivering powerful solutions for customer behavior profiling, pattern generation, analysis and comparison, and data management.

First, the local computation engine (LCE) engine 330 builds and incrementally updates customer buying behavior profiles by mining transaction records 102 flowing into the data-warehouse 114 on a periodic basis. Second, the LCE 330 maintains profiles by staging data between the data-warehouse 114 and an OLAP multidimensional database 340. For example, a profile cube 108, a profile snapshot cube 106, and an updated profile cube 104 (which are part of the OLAP multidimensional database 340) can be generated based on data received from the transaction table 290 and the profile table 280. The profile cube 108, the profile snapshot cube 106, and the updated profile cube 104 are described in greater detail hereinafter. Third, the LCE 330 derives multilevel and multidimensional customer buying patterns from the updated profile cube 104.

The data warehouse 114 includes a profile table 280 for the storing customer profile information and a transaction table 290 for storing sales transactions 102. For example, transactions 102 may be loaded into the transaction table 290 on a periodic basis (e.g., on a daily basis).

In one embodiment, the data warehouse 114 can be implemented with an Oracle-8 based telecommunication data-warehouse, and the OLAP server 112 and multi-dimensional database 340 can be implemented with an Oracle Express multidimensional OLAP server. The local computation engine 330 is preferably implemented by OLAP programming (i.e., by a program written in a scripting language provided by the OLAP server 112).

Figure 3:
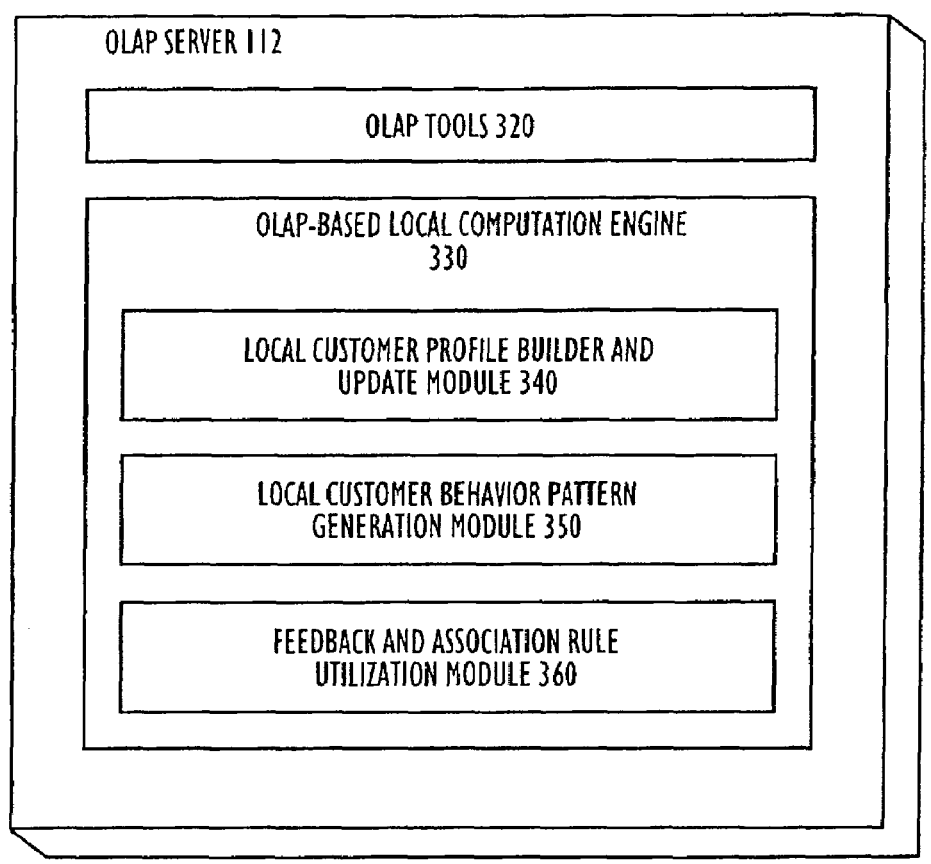
FIG. 3 illustrates in greater detail the local computation engine of FIG. 2.

FIG. 3 is block diagram illustrating in greater detail the OLAP server 112 of FIG. 2. The OLAP server 112 includes traditional OLAP analysis and visualization tools 320 that are typically used for query and analysis of corporate data, such as sales, marketing, financial, manufacturing, or human resources data. The OLAP server 112 also includes the local computation engine (LCE) 330, which in accordance to one embodiment of the present invention, is an OLAP-based scalable computation engine for creating profiles, updating profiles, deriving shopping behavior patterns from profiles, and analyzing and comparing these patterns.

The LCE 330 includes a local profile builder and update module (LPBUM) 340, a local behavior pattern generation module (LBPGM) 350, and a feedback and association rule utilization module (FARUM) 360. The local profile builder and update module (LPBUM) 340 builds and updates customer profiles by incrementally mining the transaction data that flows periodically into the data-warehouse 114. Mining refers generally to the well-known process of converting data in a first format (e.g., a record format suited for a relational database) into a second format (e.g., a multi-dimensional cube format suited for a multi-dimensional database).

The local behavior pattern generation module (LBPGM) 350 derives customer behavior patterns (e.g., calling pattern cubes) from the customer profiles. The feedback and association rule utilization module (FARUM) 360 receives the association rules and other feedback generated by the GDOS 150 and utilizes the feedback information for business-planning, such as inventory management and sales promotion.

GDOS 150

A global data warehouse 154 and one or more OLAP servers 152 are maintained in the GDOS 150. The GDOS 150 has bi-directional communications with the LDOS 110, 130. It combines the summary information from multiple LDOSs to build and incrementally update global customer profiles, association rules, etc, which cannot be completed at a single LDOS, feed back 160 the resulting profiles, rules and other derived objects such as alternative promotion plans, to the LDOSs. Multilevel and multidimensional customer shopping patterns may be extracted, analyzed and compared. In a present implementation, the volume cubes 157 for generating association rules 159 are extracted from cubes representing customer profiles 156, which will be described in more detail.

To achieve the object, the GDOS and the LDOSs operate in a cooperative manner. The GDOS relies on the LDOSs to reduce data load and computation load for enhanced scalability; and the customer profiles and rules are generated at the GDOS by using the summary information fed by the LDOSs in combination. As can be appreciated by those skilled in the art, more stations, or levels thereof, may be introduced based on the particularity of the individual systems.

Figure 4:
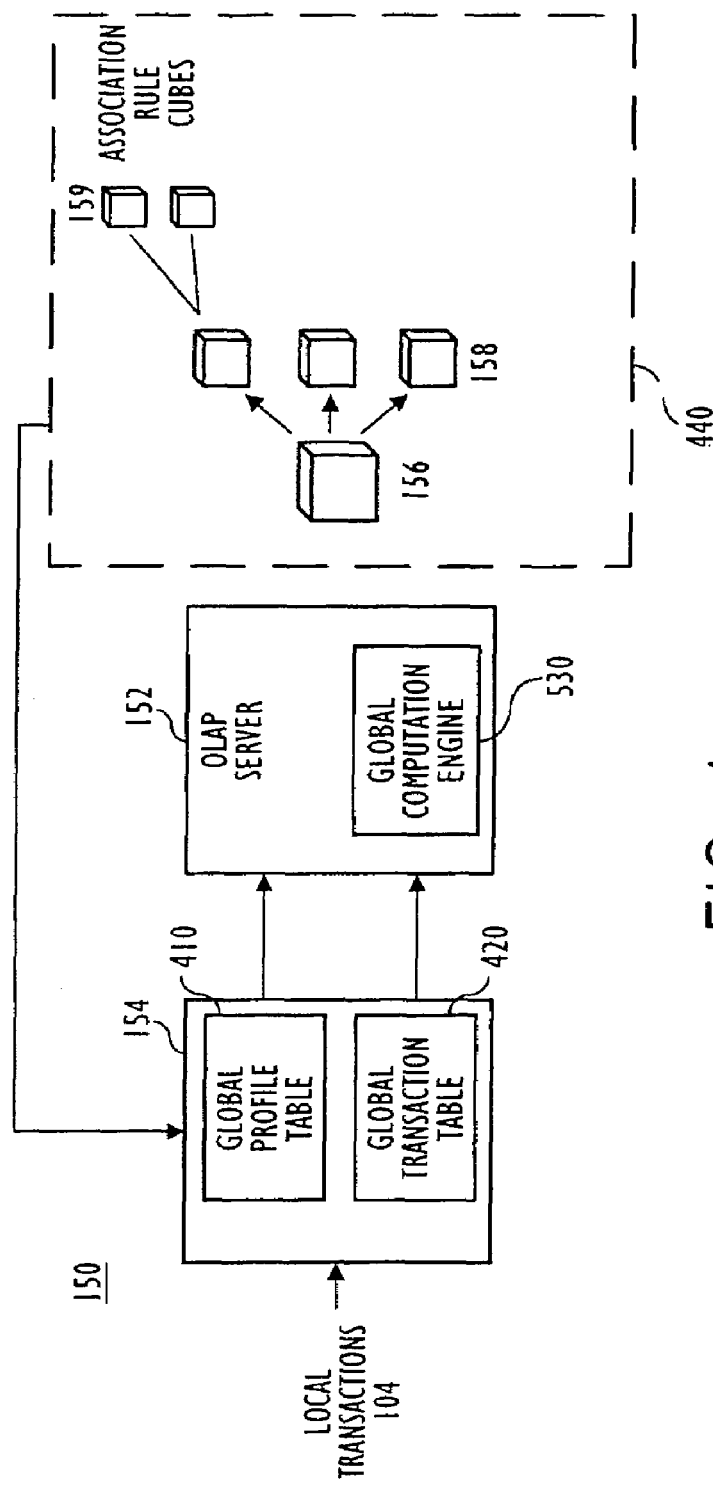
FIG. 4 illustrates in greater detail the GDOS of FIG. 1.

FIG. 4 is a block diagram illustrating the GDOS 150 of FIG. 1. The GDOS 150 includes a data warehouse 154, an OLAP server 152 that has a global computation engine (GCE) 530, and a multi-dimensional database 440. The present invention powerfully extends the function of a traditional OLAP server 152 by providing the global computation engine 530. In the preferred embodiment, the global computation engine 530 of the present invention is an OLAP-based engine. As will be described in greater detail hereinafter with reference to FIG. 5, the OLAP-based global computation engine 530 of the present invention provides a scalable engine for delivering powerful solutions for customer behavior profiling, pattern generation, and association rule generation.

First, the global computation engine (GCE) engine 530 builds and incrementally updates customer buying behavior profiles by mining local transaction records 104 flowing into the data-warehouse 154 from the LDOS (e.g., LDOS 110 and 130). Second, the GCE 530 maintains profiles by staging data between the data-warehouse 154 and an OLAP multidimensional database 440. For example, a global updated profile cube 156, one or more global behavior pattern cubes 158, and one more association rule cubes 159 (which are part of the OLAP multidimensional database 440) can be generated based on data received from the global transaction table 420 and the global profile table 410. These cubes are described in greater detail hereinafter. Third, the GCE 530 derives multilevel and multidimensional customer buying patterns 158 from the updated profile cube 156. Fourth, the GCE 530 generates one or more association rule cubes 159 based on the behavior patterns 158.

The data warehouse 154 includes a global profile table 410 for the storing customer profile information and a global transaction table 420 for storing sales transactions 104 received from the LDOSs. For example, transactions 104 may be loaded into the global transaction table 420 on a periodic basis (e.g., on a daily basis).

In one embodiment, the data warehouse 154 can be implemented with an Oracle-8 based telecommunication data-warehouse, and the OLAP server 152 and multi-dimensional database 440 can be implemented with an Oracle Express multidimensional OLAP server. The global computation engine 530 is preferably implemented by OLAP programming (i.e., by a program written in a scripting language provided by the OLAP server 152).

Figure 5:
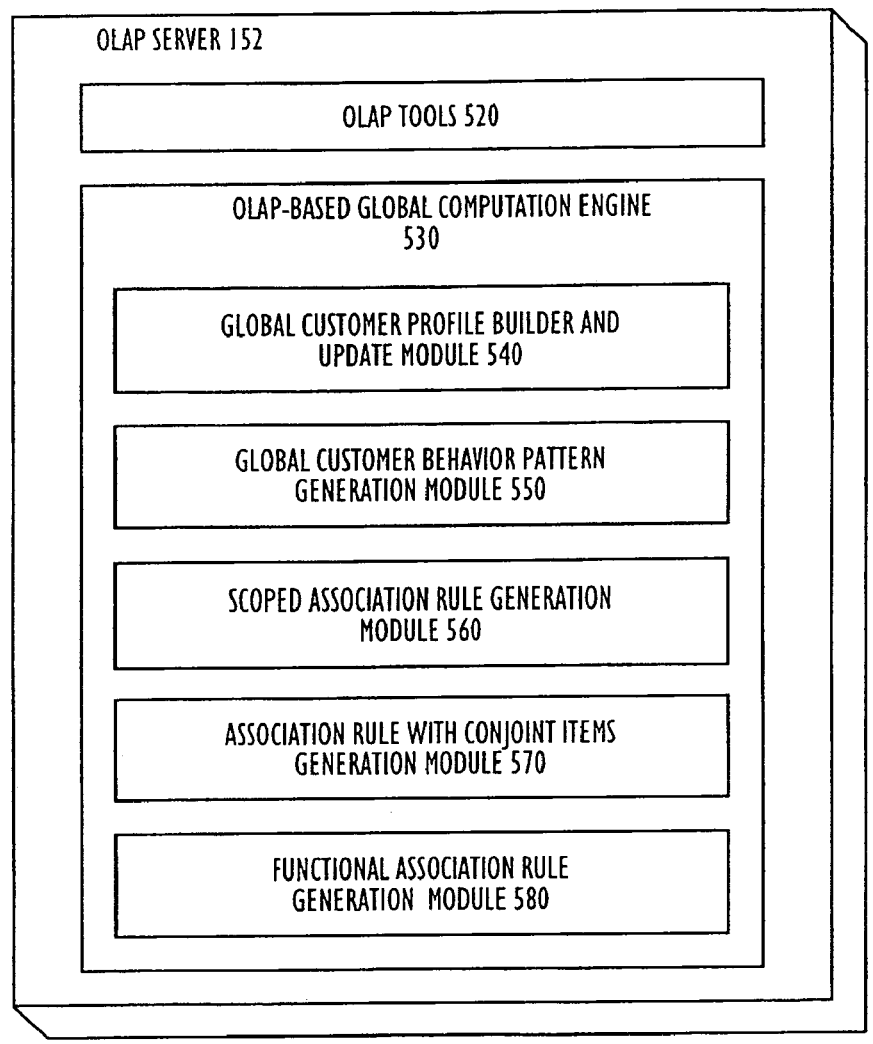
FIG. 5 illustrates in greater detail the global computation engine of FIG. 4.

FIG. 5 is block diagram illustrating in greater detail the OLAP server 152 of FIG. 4. The OLAP server 152 includes traditional OLAP analysis and visualization tools 520 that are typically used for query and analysis of corporate data, such as sales, marketing, financial, manufacturing, or human resources data. The OLAP server 152 also includes the global computation engine (GCE) 530, which in accordance to one embodiment of the present invention, is an OLAP-based scalable computation engine for creating profiles, updating profiles, deriving shopping behavior patterns from profiles, and generating association rules based on these patterns.

The GCE 530 includes a global profile builder and update module (GPBUM) 540, a global behavior pattern generation module (GBPGM) 550, a scoped association rule generation module 560, an association rule with conjoint items generation module 570, and a functional association rule generation module 580. The GPBUM 540 builds and updates customer profiles by incrementally mining the transaction data 104 that flows periodically into the data-warehouse 154. The GBPGM 550 derives customer behavior patterns (e.g., shopping pattern cubes) from the customer profiles.

The scoped association rule generation module 560 generates association rules that have different underlying bases (i.e., different populations over which the rule is defined). Two examples of these scoped association rules are a cross-sale association rule that is based on transactions and a cross-sale association rule that is based on customers. The association rule having conjoint items generation module 570 generates association rules that includes a conjoint dimension (e.g., a cube where a cell in the association can cross two values). The functional association rule generation module 580 generates association rules having predicates, consequent, and antecedent where the rule's predicates include variables, and the variables in the consequent are functions of those in the antecedent.

The association generation modules (560, 570 and 580 generate different classes of association rules, which are described in greater detail hereinafter, based on the customer behavior patterns. These association rules that have a global perspective, which is not possible at the local level, are provided to the LDOSs and specifically provided to the feedback and association rule utilization module (FARUM) 360 of the LDOS for use in business planning.

One aspect of the present invention is directed to generating customer profiles to reflect customers' shopping behavior patterns, which in turn can be used for personalized marketing and commercial promotions. Also, the present invention continuously and incrementally mines association rules that can be used to identify opportunities for cross-selling, explain causes of sudden sale increases or drops, or analyze shopping trends.

3. Customer Profiles and Shopping Patterns

To take advantage of the aforementioned data warehouse system of GDOS and LDOSs, customer profiles and shopping patterns are represented as cubes. A cube C has a set of underlying dimensions $D_1, \ldots, D_n$, and is used to represent a multidimensional measure. Each cell of the cube is identified by one value from each of the dimensions, and contains a value of the measure. The measure can be said to be dimensioned by $D_1, \ldots, D_n$. The set of values of a dimension D, called the domain of D, may be limited (by the OLAP limit operation) to a subset. A sub-cube (slice or dice) can be derived from a cube C by dimensioning C by a subset of its dimensions, and/or by limiting the value sets of these dimensions.

3.1 Profile Cubes ("PF")

A profile cube PF contains profiling information of multiple customers, and has dimensions kind, product, customer, merchant, time, and area. It is derived from the transaction data stored in the relational data warehouse. For example, the profile cube, PF, can be defined in the Oracle Express® Language as:

define PF variable decimal<kind, sparse<product, customer, merchant, time, area>> where dimension kind has values 'saleInUnits', 'saleInDollars', 'discounts', 'couponDiscounts', 'loyaltyDiscounts', 'paymentMethods', etc. Introducing this dimension facilitates the representation of multiple measures by the single cube. Decimal data type is preferably used to cover all numerical data types. A specific integer measure may be derived from a profile cube, and the integer data type converted from the decimal data type.

Note that the use of keyword "sparse" in the above definitions instructs Oracle Express to create a composite dimension<product, customer, merchant, time, area>, in order to handle sparseness in an efficient way. A composite dimension is a list of dimension-value combinations. A combination is an index into one or more sparse data cubes. The use of a composite dimension allows Oracle Express to store sparse data in a compact form similar to relation tuples.

Profile cubes are currently maintained at both the GDOS and the LDOSs. At a LDOS, a local profile cube is populated by means of binning. A transaction data record contains fields with values mapping to each dimension of the cube. Such mapping is referred to as binning. For example, '01Jan98 8:44am' is mapped to time-bin '01Jan98'. A transaction made at '01Jan98 8:44am' and at the 'Safeway Market' in S.F. falls into the cell corresponding to time='01Jan98' and area='S.F.'. At the GDOS, a centralized profile cube with desired coverage in time, area etc, is retrieved from the database and updated by merging the appropriate local profile cubes, and then may be stored back to database, which can be accomplished using Oracle Express. Let PF be the centralized cube and $PF_1, \ldots, PF_k$ the local ones. Their merge is simply expressed as: $PF=PF+PF_1+ \ldots +PF_k$. In this way, customer profiles are combined and updated incrementally as each new local cube flows into the GDOS.

3.2 Hierarchical Dimensions for Multilevel Pattern Representation

Shopping pattern cubes are derived from profile cubes and used to represent the shopping behavior of individual customers. In order to represent such shopping behavior at multiple levels, each of the dimensions is defined to be a hierarchical dimension, along which the shopping pattern cubes can rollup.

A hierarchical dimension D contains values at different levels of abstraction. Associated with D there are a dimension DL describing the levels of D, a relation DL_D mapping each value of D to the appropriate level, and a relation D_D mapping each value of D to its parent value (the value at the immediate upper level). Let D be an underlying dimension of a numerical cube C. D, together with DL, DL_D and D_D, fully specify a dimension hierarchy. They provide sufficient information to rollup cube C along dimension D, that is, to calculate the total of cube data at the upper levels using the corresponding lower-level data. A cube may be rolled up along multiple underlying dimensions. In the applications presently implemented, the following hierarchies are introduced:

The PRODUCT HIERARCHY is made up of the following objects:
- product: dimension with values at the product level (e.g. 'HP Inkjet500'), product_category level (e.g. 'printer'), etc, and a special value 'top' at top-level.
- prodLevel: dimension with values 'prod_item', 'prod_category', 'prod_kind', 'top'.
- prod_prod: parent relation (product, product) mapping each value to its parent, e.g.
    prod_prod(product 'HP Inkjet500'='printer'
    . . .
    prod_prod(product 'top')=NA
- prodLevel_prod: level relation (product, prodLevel) mapping each value to its level, e.g.
    prodLevel_prod(product 'HP Inkjet500')='prod_item'
    prodLevel_prod(product 'printer')='computer peripheral'

Analogously, the MERCHANT HIERARCHY is made up of dimension merchant; dimension mercLevel with values 'store', 'store category' and 'top'; parent relation merc_merc and level relation mercLevel_merc. The CUSTOMER HIERARCHY is made up of dimension customer; dimension custLevel with values 'shopper', 'shopper_group', 'shopper_category' and 'top'; parent relation cust_cust and level relation custLevel_cust. The TIME HIERARCHY is made up of dimension time; dimension timeLevel with values 'day', 'month', 'year' and 'top'; parent relation time_time and level relation timeLevel_time. The AREA HIERARCHY is made up of dimension area; dimension areaLevel with values 'city', 'state', 'region' and 'top'; parent relation area_area and level relation areaLevel_area.

For storing, combining and updating profile cubes, the bottom level of each dimension is preferably used. For analysis, shopping pattern cubes are used, and they are allowed to rollup along any hierarchical dimensions.

3.3 Deriving Shopping Pattern Cubes from Profile Cubes

Various shopping patterns can be derived from profile cubes and handled as shopping pattern cubes. They may be used to represent the shopping behavior of a collection of customers or a single customer; they may be based on volumes or probability distributions; and they may be materialized (defined as variables) or not (defined as formulas).

Multiple or Single Customer Based Patterns

For example, a cube representing a single measure, Sale Units may be defined as a formula (view) of the above profile cube PF by the following.

define SaleUnitsformula int<product, customer, merchant, time, area>
EQ PF(kind 'saleIn Units')

A cube representing the same measure for a single customer, say, 'Doe', is defined as define Sale Units.1 formula int<product, merchant, time, area>
EQ PF(kind 'salein Units', customer 'Doe')

Volume or Probability Distribution Based Patterns

In a volume-based shopping pattern cube, each cell value is a quantitative measure. The cube may be rolled up along its hierarchical dimensions. For example, cube Sale Units defined above can be rolled up along dimension product using relation prod_prod, and analogously, along dimensions customer, merchant, time, area. The cell values of this cube are the number of purchased products falling to the given 'slot' of time, area, etc. For example:

SaleUnits(product 'pen', customer 'John Doe', merchant 'Sears', time '01Jan98', area 'San Francisco')

gives the number of pens purchased by John Doe at Sears in San Francisco on 01Jan.98;

Sale Units.Doe(product 'pen', customer 'John Doe', merchant 'top', time 'top', area 'top')

gives the number of pens purchased by John Doe anywhere and anytime covered by the profiling period and area.

Cubes representing probability distribution based shopping patterns are derived from volume-based pattern cubes. They provide more fine-grained representation of dynamic behavior than fixed value based ones. They also allow shopping patterns corresponding to different lengths of profiling interval to be compared.

Cubes representing different probability measures can be derived from the profile cube. For example, the following cube, PLD, represents the probability distributions of loyalty discounts over all discounts along multiple dimensions:

define PLD variable decimal<customer, product, merchant, time, area>

It can be calculated through the following steps.

Define cubes LoyaltyDiscount and Discount over dimensions customer, product, merchant, time, area Populate LoyaltyDiscount and Discount as sub-cubes of PF with dimension kind limited to "LoyaltyDiscount" and "Discount" respectively Rollup LoyaltyDiscount and Discount along dimension product, merchant, time and area Then PLD=LoyaltyDiscount/Discount (please note this is a cell-wise operation)

Probability distributions measured from different standpoints may also be derived.

a merchant, such as Sears chain store, can discover the overall feedback to a promotion by summarizing information from multiple distributed locations;

the shopping behavior of individual customers, e.g. the purchase volume, the loyalty to discount offer, can be compared with the overall shopping behavior for guiding personalized promotion;

customers can get shopping guidelines by examine the probability distributions of products sold in multiple areas.

For efficiency as well as consistency, it is preferable to store profile cubes persistently in the data-warehouse. Shopping patterns, either based on volume or probability, can be derived on the fly (at analysis time) using the OLAP engine for computation. This shows the simplicity, and yet the power, of using OLAP to handle customer profiling.

4. Extended Association Rules

One of the applications of the distributed data-warehouse/OLAP system of the present invention is to enhance association rule mining. In e-commerce, association rules benefit both merchants and customers. However, association rules are typically created and incrementally updated from hundreds of millions of transaction records generated daily.

The distributed data warehousing and OLAP system of the present invention can distribute data processing, reduce data volumes at each local site by summarization, and mine data incrementally at multiple levels. In addition to scaling up rule mining, this system can combine information from different locations for generating association rules with enhanced expressive power. As will be described in the following, multilevel and multidimensional association rules can be extended by introducing scoped association rules, association rules with conjoint items and functional association rules, and the rules can be computed using data cubes and OLAP.

4.1 Scoped Multidimensional and Multilevel Association Rules

As can be appreciated by those skilled in the art, association rules provide a quantitative measurement of the association relationships between facts. Association rule mining aims at inferring such relationships from transaction summary data. For example, a cross-sale association rule is used to answer "how many customers who bought product A, also bought product B in one month?" An association rule can be simply expressed by $X \Rightarrow Y$, where X is its antecedent, and Y is its consequent and they are conjunctive predicates. Related to each association rule there is a CONFIDENCE and a SUPPORT.

In the above example, if 80% of the customers who bought A also bought B, and only 10% of all the customers bought both, it can be said that the association rule has confidence 80% and support 10%. Given application-specific minimum support and confidence thresholds, a rule is considered strong if it satisfies these thresholds.

Base.

An association rule has an underlying base B that contains a population over which the rule is defined. The scoped association rule generation module_can generate association rules that have different bases. For example, the scoped association rule generation module_can generate a cross-sale association rule that is based on transactions, as:

$X \in$ Transactions: contain_product(x, A)$\Rightarrow$contain_product (x, B), or based on customers, as:

$x \in$ Customers: buy_product(x, A)$\Rightarrow$buy_product(x, B), regardless of whether they made such purchase in the same transaction or not.

In this example, the association rule uses binary predicates with the first place denoting a base element and the second place denoting an item. In these examples, the items are elements of a set of products.

The ability to generate association rules with different bases or the present invention is important to enable cooperative rule mining between GDOS and LDOSs. For example, if the customers of interest shop at several locations covered by different LDOSs, then customer based cross-sale association rules should be mined at GDOS on the summary data fed from multiple LDOSs. If the customers of interest are partitioned geographically and covered by individual LDOSs, such rules can be first mined locally at each LDOS and then assembled in the GDOS.

Scoped Association Rule.

As noted previously, scoped association rule generation module 560 generates association rules with different bases, which are referred to as scoped association rules. For a rule
B:X ⇒Y, the set of base elements in B that match X is denoted by $P_x$, and its cardinality is denoted by $|P_x|$. The confidence of rule X⇒Y in B, denoted by $\xi_B(X \Rightarrow Y)$, can be calculated by $\xi_B(X \Rightarrow Y)=|P_x \cap P_y|/|P_x|$, ranging from 0 to 1. The support of rule X⇒Y in B, denoted by $\theta_B(X \Rightarrow Y)$, can be calculated by $\theta_B(X \Rightarrow Y)=|P_x \cap P_y|/|B|$. For simplicity, when the base B is understood from the context, the suffix B from $\xi$ and $\theta$ is dropped.

Multidimensional Association Rule.

The scoped association rule generation module_also provides multidimensional association rules, e.g.

[x∈Customers: buy_product(x, 'A')⇒buy_product(x, 'B')]
|merchant='Sears', area='Los Angeles', time='Jan98'

In this example, customer is the base, products are the items, and merchant, area and time are underlying features of the rule. Essentially, the base of multidimensional rules is dimensioned by the features.

Multilevel Association Rule.

Further, the scoped association rule generation module-_can provide multilevel association rules. For example, an area may be represented at city level (e.g. San Francisco) or at state level (e.g. California); a time may be represented at day, month or year levels. Accordingly, the scoped association rule generation module_can generate and specify association rules at different area levels and time levels, e.g.

[x∈Customers: buy_product(x, 'A')⇒buy_product(x, 'B')]
|merchant='Sears', area='Los Angeles', time='Jan98'

[x∈Customers: buy_product(x, 'A')⇒buy_product(x, 'B')]
|merchant='Sears', area='Calfornia', time='Jan98'

[x∈Customers: buy_product(x, 'A')⇒buy_product(x, 'B')]
|merchant='Sears', area='California', time='Year98'

For multidimensional association rules, the cardinalities, confidence and support are dimensioned by, or as functions of, the features.

4.2 Cube-based Association Rule Mining

Association rules are represented by cubes. Volume cubes, where cell values are counts, are used for deriving and measuring multidimensional $|P_x \cap P_y|$, $|P_x|$, and $|B|$ in the intermediate steps of computing multidimensional association rules.

Volume Cube.

A volume cube contains multidimensional counts for deriving association rules. For example, cross-sale association rules are derived from volume cubes such as SaleUnits (customer, product, merchant, time, area).

Each cell contains the number of purchased units dimensioned by customer, product, merchant, time and area. This cube is derived from a profile cube and materialized for mining cross-sale association rules.

Volume cubes such as SaleUnits are maintained at both GDOS and LDOSs. At a LDOS, a local cube is populated from transaction data. At the GDOS, a centralized cube with desired coverage in time, area, etc., is retrieved from the database and updated by merging local cubes.

The dimensions of a volume cube, as well as other association rule related cubes, can be classified into the following categories for the purpose of association rule mining:

Item dimensions on which volume data for quantifying the association relationship are counted, such as the product dimension in the above example.

Base dimensions on which rules are quantified such as the customer dimension. A volume cube may rollup along its hierarchical dimensions, but not along a base dimension. For example, aggregating the number of purchased products along the customer dimension to a high-level customer value, say, 'engineer', may not be meaningful to deriving cross-sale associations, e.g. if one engineer buys milk and another buys eggs, this does not imply any meaningful cross-sale association.

Feature dimensions on which the generated rules may be dimensioned such as merchant, time and area.

A volume cube $C_v$ can be used for deriving the instances of rule X⇒Y if it has a base dimension that represent the base of the rule, and the association conditions for qualifying X^Y, are definable on $C_v$. For deriving cross-sale association rules from cube SaleUnits, an association condition can be:

for each base and feature dimension, $C_v$(product A)>0^$C_v$, (product B)>0

If association conditions used to compute multidimensional $|P_x \cap P_y|$ are definable on $C_v$, then another kind of condition, called antecedent conditions that are used to compute multidimensional $|P_x|$, are also definable on $C_v$, such as:

for each base and feature dimension, $C_v$(product A)>0

Association Cube.

The association cube $C_\alpha$ for rule X⇒Y gives volume-based measure of multidimensional association relationships that are computed from the volume cube $C_v$, and is used to derive the confidence cube and the support cube of association rules. More particularly, it maintains dimensioned $|P_x \cap P_y|$, i.e. the number of base elements that satisfy X^Y.

Usually $C_\alpha$ is dimensioned differently from $C_v$. In the cross-sale association rule example, the association cube is defined as:

CrossSales (product, product2, customer_group, merchant, time, area)

A cell of this cube, CrossSales (product 'A', product2 'B', customer_group 'engineer', merchant 'Sears', time 'Jan98', area 'Los Angeles')=4500 means that there are 4,500 customers who are engineers, who bought item A as well as item B, at a Sears store in Los Angeles in Jan98.

The item dimensions, base dimension and feature dimensions of an association cube can be explained below.

Item dimensions underlying the counts for deriving association rules, such as dimensions product and product2 for the above CrossSales cube. product2 has the same set of values as product, and it is called the mirror dimension of product. A mirror dimension can be introduced simply because the cross-sale association rule involves more than one element of the item dimension.

Base dimension underlying the base of rules such as the customer dimension. Unlike the volume cube, the association cube does not necessarily have to be dimensioned by the base dimension. However, rules can be dimensioned by the dimension with each value identifying a group of base dimension values at bottom levels. In cube CrossSales shown above, the hierarchical dimension customer_group is introduced, which has levels 'customer_profession', 'customer category' and 'top'. A relation is also defined for relating customers and customer groups. For example, a value of the customer_group dimension, say, "engineer", is used to identify a group of individual customers who are engineers.

Feature dimensions such as merchant, time and area, by which rules are dimensioned.

Population Cube and Base Cube.

The population cube $C_p$ and the base cube $C_b$ for rule $X \Rightarrow Y$ are also derived from the volume cube $C_v$. $C_p$ is used to measure dimensioned $|P_X|$, i.e. the numbers of base elements satisfying X. $C_b$ is used to represent dimensioned $|B|$. For the above cross-sale rules, the population cube is defined as:

NumOJBuyers (product, customer_group, merchant, time, area)

A cell of this cube, NumofBuyers (product 'A', customer roup 'engineer', merchant 'Sears', time 'Jan98', area 'Los Angeles')=10000 means that there are 10,000 customers who are engineers, bought item A in Los Angeles in January98. The base cube is defined as:

NumOJShoppers (customer_group, merchant, time, area)

Note that NumOJShoppers is not aggregated from NumOfBuyers, as a single customer may buy multiple products.

Confidence Cube and Support Cube.

The confidence of rule $X \Rightarrow Y$, defined as $|P_X \cap P_Y|/|P_X|$, and the support, defined as $|P_X \cap P_Y|/|B|$, are represented as cubes $C_f$ and $C_s$. $C_f$ is derived from $C_\alpha$ and $C_p$; and $C_s$ is derived from $C_\alpha$ and $C_b$. They have the same dimensions as $C_a$. For the above cross-sale rules, the confidence cube and support cube are defined as:

Confidence (product, product2, customer_group, merchant, time, area)

Support (product, product2, customer_group, merchant, time, area)

Figure 6:
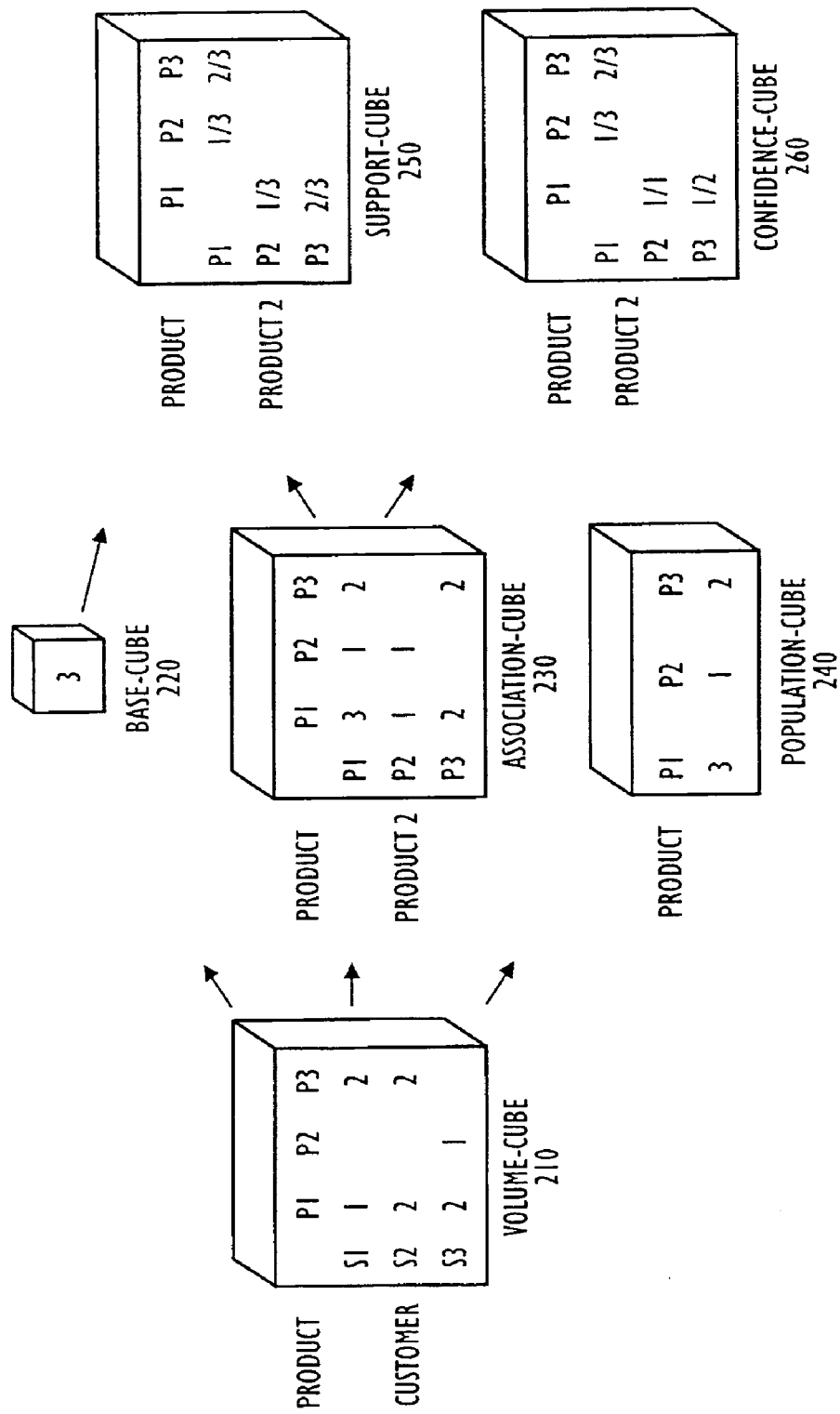
FIG. 6 illustrates the cubes related to cross-sale association rules with one slice of each cube.

FIG. 6 shows the cubes related to cross-sale association rules, with one slice of each cube. The volume-cube 210 is generated from transactions; the association-cube 230, base-cube and population-cube are derived from the volume cube; the confidence-cube 260 is derived from the association cube 230 and population cube 240; and the support-cube 250 is derived from the association-cube 230 and base-cube 220. The slices of these cubes shown in the figure correspond to the same list of values in dimension merchant, time, area and customer_group.

Multidimensional and Multilevel Association Rules.

Representing association rules by cubes and underlying cubes by hierarchical dimensions naturally supports multi-dimensional and multilevel rules. Also, these rules are well organized and can be easily queried.

First, cells of an association cube with different dimension values are related to association rule instances in different scopes. In the association cube CrossSales, cell CrossSales(product 'A', product2 'B', customer_group 'engineer', merchant 'Sears', area 'Los Angeles', time 'Jan98')

represents the following multidimensional rule:

[x∈Customers: buy_product(x, 'A')⇒buy product(x, 'B')] |customer_group='engineer', merchant='Sears', area='Los Angeles', time='Jan98'.

If this cell has value 4500, and the corresponding cell in the population cube has value 10000, then this rule has confidence 0.45.

Next, as the cubes representing rules have hierarchical dimensions, they represent not only multi-dimensional but also multi-level association rules. For example, the following cells CrossSales(product 'A', product2 'B', customer_group 'engineer', merchant 'Sears', area 'California', time 'Jan98') and CrossSales(product 'A', product2 'B', customer_group 'engineer', merchant 'Sears', area 'California', time 'Year98')

represent association rules at different area level (i.e. city level and state level) and time level (i.e. month level, year level) as

[x∈Customers: buy_product(x, 'A')⇒buy_product(x, 'B')] |customer_group='engineer', merchant='Sears', area='California', time='Jan98' and

[x∈Customers: buy_product(x, 'A')⇒buy_product(x, 'B')] |customer_group='engineer', merchant='Sears', area='California', time='Year98'.

The cell

CrossSales(product 'A', product2 'B', customer_group 'top', merchant 'top', area 'top', time 'top')

represents the customer-based cross-sale association rule for all customers, merchants, areas, and time in the given ranges of these dimensions, expressed as:

[x∈Customers: buy_product(x, 'A')⇒buy_product(x, 'B')]

4.3 Generating Association Rule Related Cubes

Cube based association rules are represented by cubes and generated in terms of cube manipulations. In most of the intermediate steps, these operations are performed on sub-cubes. In fact, manipulating sub-cubes is basic to cube based association rule mining.

Converting one cube, C, into another, C', means populating the cells of C' by the values calculated from certain cell values of C. Very often, such populating operations are performed on sub-cubes. Given a cube C[D] with underlying dimensions $D_1, \ldots, D_n$, which can be hierarchical, a sub-cube (dice) of C is formed by limiting the values of one or more dimensions. The typical way to relate a pair of sub-cubes of C and C' is to select a sub-cube in one, say, C', and map the dimension values limited to that sub-cube to the (same or related) dimension values underlying a corresponding sub-cube of C.

The basic task of the current OLAP based association rule mining, either at the GDOS or at a LDOS, is to convert a volume cube, i.e. the cube representing the purchase volumes of customers dimensioned by product, area, etc, into an association cube, a base cube and a population cube. These cubes are then used to derive the confidence cube and the support cube of multidimensional association rule instances.

The association rule with antecedent and consequent coming from the same dimension is referred to as cross association rule. Cross-sale association rules are one kind of cross association rules. A general algorithm for generating cross-association rules can developed, with the following example illustrating the derivation of multilevel, multidimensional and scoped cross-sale association rules from the volume cube Sale Units. Related cubes are as defined before. The following should be noted:

Cross-sale association rules at multiple product levels are generated. That is, at item level (e.g. how the sale of a particular CD is associated with the sale of another); at category level (e.g. how the sale of beer is associated with the sale of diapers, regardless of the brands of these products); and at kind level. For this purpose the ProductLevel dimension is introduced. However, for semantic clarity, rules crossing product levels are not provided.

In the volume-cube Sale Units, only the bottom-level values of customer dimension (even if it is a hierarchical dimension) are currently presented. In the association-cube CrossSales, the value of customer_group dimension, e.g. "engineer", is mapped to a set of individual customers who are engineers, in order to represent individual based association in the scope of engineers.

Mirror dimension product2 is introduced to represent association rules across products.

The steps of cross-sale association rule mining are listed below:

Rollup the volume cube SaleUnits by aggregating it along merchant, time, area dimensions.
Derive cube NumOfBuyers, NumOfShoppers for each c in customer_group {
  limit customer values to those corresponding to c at bottom level of customer dimension, for underlying subcubes of SaleUnits, NumOfBuyers and NumOfShoppers.
  populate the resulted subcube of NumOfBuyers that is dimensioned by product, merchant, area, time, based on antecedent condition SaleUnits>0, i.e. each cell is assigned the number of individual customers corresponding to the underlying dimensions, that satisfy the antecedent condition.
  populate the resulted subcube of NumOfShoppers by the counts of customers dimensioned by merchant, area, time (not by product) that satisfy the antecedent conditions.
}

Derive cube Confidence and cube Support (cell-wise operation)
Confidence=CrossSales/NumOfBuyers
Support=CrossSales/NumOfShoppers
  (Confidence, Support, CrossSales is dimensioned by product, product2, customer_group, merchant, time, area
  NumOfBuyers is dimensioned by product, customer_group, merchant, time, area
  NumOfShoppers is dimensioned by customer_group, merchant, time, area)

Rules with confidence and support that meet predetermined thresholds can be utilized for business planning purposes. These predetermined thresholds can vary from application to application and can depend on many factors, such as the particular item or product, the geographical area, and type of market.

4.4 Mining Association Rules with Conjoint Items.

The present invention utilizes cubes with conjoint dimensions to represent refined multidimensional association rules. For example, the association rule with conjoint items generation module 570 can derive association rules across time. Time-variant, or temporal association rules such as

[x∈Customers: buy_product(x,'A', 'Jan98')⇒buy_product (x, 'B', 'Feb98')]|area='Los Angeles' can be used to answer such questions as "How are the sale of B in Feb98 associated with the sale of A in January98?" The items in this rule are value pairs of dimensions product and time.

In order to specify this kind of association rule, a conjoint dimension<product, time> is introduced, and mirrored to dimension<product2, time2>. This allows a cell in the association cube to cross two time values. Accordingly the association cube, base cube and population cube are defined as:

Association cube: CrossSales.2 (<product, time>, <product2, time2>, customer_group, merchant, area)
Population cube: NumOjBuyers.2 (<product, time>, customer_group, merchant, area)
Base cube: NumOJShoppers.2 (customer_group, merchant, area).

The confidence cube and the support cube are defined as follows:

Confidence cube: Confidence.2 (<product, time>, <product2, time2>, customer_group, merchant, area)
Support cube: Support.2 (<product, time>, <product2, time2>, customer_group, merchant, area).

---

```
Derive cube CrossSales
for each product level (i.e. item level, category level and kind level) {
    limit Product to the values at this level, and populate product2 with the current range of product.
    for each c in customer_group {
    limit customer values to those corresponding to c at the bottom level of customer dimension.
    for each p₁ in product {
            for each p₂ in product2 {
            dimensioned by merchant, time, area, assign CrossSales by the total number of
            customers that satisfy the association conditions
                SaleUnits(product p₁) > 0 and SaleUnits(product2 p₂) > 0
            }
        }
    }
}
```

The steps for generating these cubes are similar to the ones described before. The differences are that a cell is dimensioned by, besides others, <product, time> and <product2, time2>, and the template of the association condition is:

SaleUnits(<product pi, time $t_1$>)>0 and SaleUnits(<product2 $p_2$,time2 $t_2$>)>0, where in any instance of this condition, the time expressed by the value of time2, is not contained in the time expressed by the value of time. The template of the antecedent condition is: SaleUnits(<productpl, time t,>)>0.

As can be appreciated by those skilled in the art, other dimensions such as area may be added to the conjoint dimensions to specify more refined rules.

4.5 Mining Functional Association Rules.

The functional association rule generation module 580 can generate multidimensional function association rules. A multidimensional association rule is functional if its predicates include variables, and the variables in the consequent are functions of those in the antecedent. For example, functional association rules can be used to answer the following questions, where a_month and a_year are variables.

What is the percentage of people in California who buy a printer in the next month after they bought a PC? i.e.
[x∈Customer: buy_product(x, 'PC', a_month)⇒buy_product(x, 'printer', α_month+1)]|area='California'.

What is the percentage of people who buy a printer within the year when they bought a PC? i.e.
[x∈Customer: buy_product(x, 'PC', α_year)⇒buy_product(x, 'printer', α_Year)]|area='California'.

To distinguish, the association rules that are not functional are called instance association rules, such as:
[x∈Customer:buy product(x, 'PC', 'Jan98')⇒buy_product (x, 'printer', 'Feb98')]|area='California'.

Time variant, functional association rules can be derived from time variant, instance association rules through cube restructuring. Let us introduce a new dimension time_delta that has values one_day, two_day, . . . , at day level, and values one_month, two_month, . . . , at month level, etc. Then let us consider the following functional association rule related cubes.

Association cube: CrossSales.3 (product, product2, customer_group, merchant, area, time-delta)
Population cube: NumOfBuyers.3 (product, customer_group, merchant, area)
Base cube: NumOfShoppers.3 (customer_group, merchant, area)
Confidence cube: Confidence. 3 (product, product2, customer_group, merchant, area, time_delta)
Support cube: Support. 3 (product, product2, customer_group, merchant, area, time_delta)

The association cube CrossSales.3 can be constructed from CrossSales.2 by binning illustrated below:

```
for each <p₁, t₁> in <product, time> {
  for each <p₂, t₂> in <product2, time2> {
    dimensioned by merchant, area, add value
      CrossSales.2(<product p₁, time t₁>, <product2 p₂, time2 t₂>)
    to the value of
      CrossSales.3(product p₁, product2 p₂, time_delta t₂ - t₁)
  }
}
```

The cell values of CrossSales.2 in the selected time and time2 ranges are added to the corresponding cells of CrossSales.3. For example, the count value in cell:

CrossSales.2(<PC, January98>, <printer, Feb98>. . . )

is added to cell (bin): CrossSales.3(PC, printer, one_month, . . . )

It can also be added to cell: CrossSales.3(PC, printer, one_year, . . . ).

5. Distributed and Incremental Rule Mining.

There exist two ways to deal with association rules:

Static, that is, to extract a group of rules from a snapshot, or a history, of data and use "as is Dynamic, that is, to evolve rules from time to time using newly available data.

Since association rules are mined from an e-commerce data warehouse holding transaction data, the data flows in continuously and are processed daily.

As can be appreciated by those skilled in the art, mining association rules dynamically has the following benefits:

"Real-time" data mining, that is, the rules are drawn from the latest transactions for reflecting the current commercial trends.

Multilevel knowledge abstraction, which requires summarizing multiple partial results. For example, association rules on the month or year basis cannot be concluded from daily mining results. In fact, multilevel mining is incremental by nature.

Scalability, as there is no computing resource allowing us to mine a data set with arbitrary size, incremental and distributed mining have become a practical choice.

Incremental association rule mining can be achieved by combining partial results. As can be understood by those skilled in the art, the confidence and support of multiple rules may not be combined directly. This is why they are treated as "views" and only maintain the association cube, the population cube and the base cube that can be updated from each new copy of volume cube. Several cases are described below to show how a GDOS can mine association rules by incorporating the partial results computed at LDOSs.

The first case is to sum up volume-cubes generated at multiple LDOSs. Let $C_{v,i}$ be the volume-cube generated at $LDOS_i$. The volume-cube generated at the GDOS by combining the volume-cubes fed from these LDOSs is $$C_v = \sum_{i=1}^{n} C_{v,i}.$$

The association rules are then generated at the GDOS from the centralized CV.

The second case is to mining local rules with distinct bases at participating LDOSs, resulting in a local association cube $C_{\alpha,i}$ a local population cube $C_{p,i}$ and a local base cube $C_{b,i}$ at each LDOS. At the GDOS, multiple association cubes, population cubes and base cubes sent from the LDOSs are simply combined, resulting in a summarized association cube and a summarized population cube, as $$C_a = \sum_{i=1}^{n} C_{a,i}, \quad C_p = \sum_{i=1}^{n} C_{p,i} \text{ and } C_b = \sum_{i=1}^{n} C_{b,i}.$$

The corresponding confidence cube and support cube can then be derived as described earlier. Cross-sale association rules generated from distinct customers belong to this case.

As can be understood by those skilled in the art, it is in general inappropriate to directly combine association cubes which cover areas $\alpha_l, \ldots, \alpha_k$, to cover a larger area $\alpha$. In the given example, this is so because association cubes record counts of customers that satisfy the association condition, and the sets of customers contained in $\alpha_l, \ldots, \alpha_k$ is not mutually disjoint. This can be seen in the following examples.

A customer bought A and B in both San Jose and San Francisco which are covered by different LDOSs, contributes a count to the rule covering each city, but has only one count, not two, for the rule A⇒B covering California.

Figure 7:
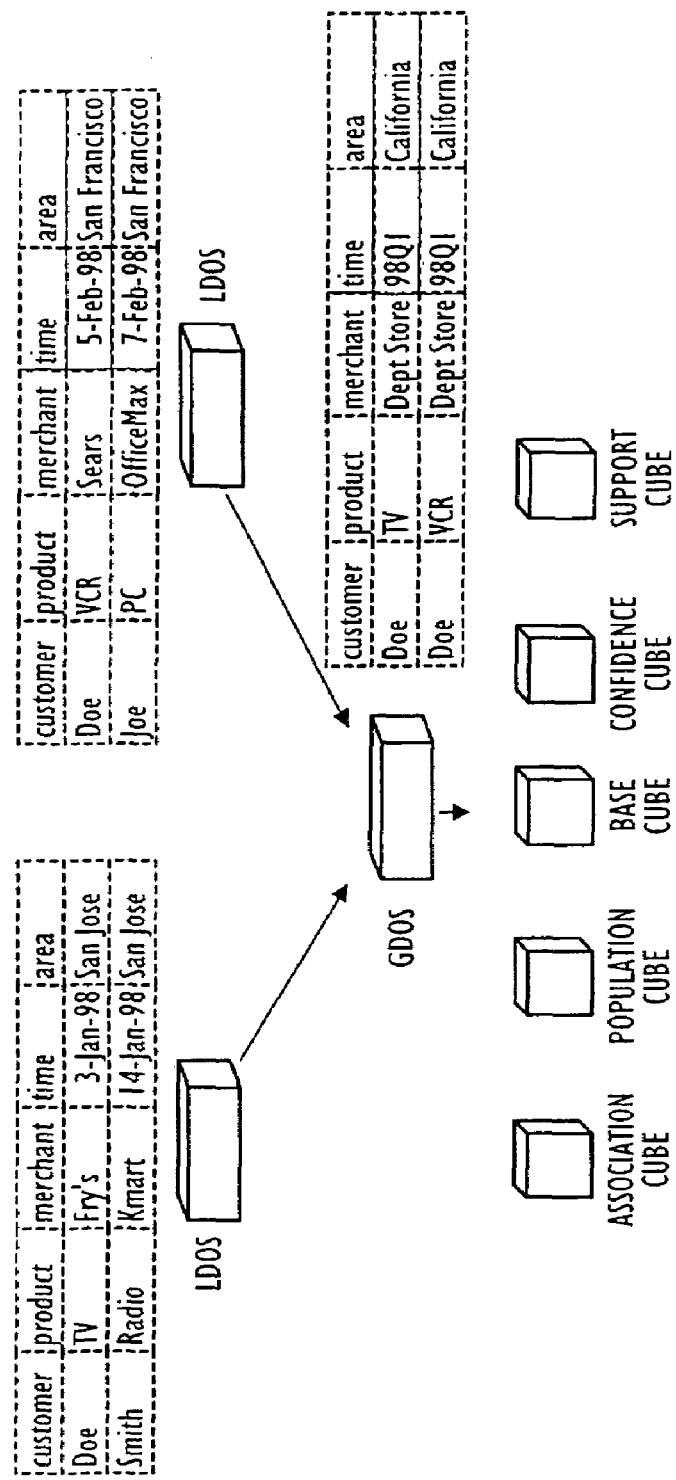
FIG. 7 illustrates an example of distributed association rule mining.

A customer (e.g. Doe in the figure below) who bought a TV in San Jose but a VCR in San Francisco, is not countable for the cross-sale association rule TV⇒VCR covering any of these cities, but countable for the rule covering California. This is illustrated in the FIG. 7.

6. In order to scale-up association rule mining in e-commerce, the present invention provides a distributed and cooperative data-warehouse/OLAP system. This system can generate association rules with enhanced expressive power, by combining information of discrete commercial activities from different geographic areas, different merchants and over different time periods. As described above, the present invention generates scoped association rules, association rules with conjoint items; and functional association rules which are new and useful extensions to prior art association rules.

Once generated by the present invention, association rules may be used to identify opportunities for cross-selling products, analyze trends, or identify causes of sudden sales increases or decreases. Association rules are important in applications such as personalized promotions or inventory management. The present invention defines customer profiles and various new classes of multi-dimensional and multi-level association rules (e.g., scoped multidimensional rules, rules with conjoint items, and functional rules) that are useful for e-commerce applications. Summary information, customer profiles, and the different classes of association rules are computed in a distributed, cooperative manner using OLAP tools. Summaries, profiles, and rules are incrementally updated as new transaction data is collected.

The foregoing description has provided an example of the present invention that is directed to sales transaction data. It will be appreciated that various modifications and changes may be made thereto without departing from the broader scope of the invention as set forth in the appended claims. For example, the method of generating, updating, and comparing the customer profiles of the present invention can be applied to other areas, such as targeted marketing and targeted promotions. In applications where there is a very large collection of transaction data, the present invention can be utilized to generate customer behavior profiles, extract patterns of the activities of the customer, generate association rules, and provide guidelines as to how to meet or otherwise service the needs of the customers.

What is claimed is:

1. A method for generating association rules comprising:
   in a processing system, receiving a volume cube that represents the purchase volume of customers;
   in the processing system, generating scoped association cubes, a population cube and a base cube based on the volume cube, wherein the scoped association cubes comprise a plurality of bases from distinct data sources; and
   in the processing system, deriving a confidence cube and a support cube of an association rule based on the association cube, population cube, and the base cube, wherein said volume cube, association cube, population cube, base cube, and confidence cube comprise multi-dimensional data structures that have elements comprising one or more aggregated dimensions and that are processed in a multi-dimensional database.

2. The method of claim 1 wherein generating an association cube, a population cube and a base cube based on the volume cube comprises generating an association cube that has at least two levels and at least two dimensions.

3. The method of claim 1 wherein generating an association cube, a population cube and a base cube based on the volume cube comprises generating a scoped association rule cube and wherein deriving a confidence cube and a support cube of an association rule based on th association cube, population cube, and the base cube comprises deriving a confidence cube and a support cube of a scoped association rule based on the association cube, population cube, and the base cube.

4. The method of claim 1 wherein generating an association cube, a population cube and a base cube based on the volume cube comprises:
   generating an association rule with conjoint items cube;
   wherein deriving a confidence cube and a support cube of an association rule based on the association cube, population cube, and the base cube comprises:
   deriving a confidence cube and a support cube of an association rule with conjoint items based on the association cube, population cube, and the base cube.

5. The method of claim 1 wherein generating an association cube, a population cube and a base cube based on the volume cube comprises:
   generating a functional association rule cube;
   wherein deriving a confidence cube and a support cube of an association rule based on the association cube, population cube, and the base cube comprises:
   deriving a confidence cube and a support cube of a functional association rule based on the association cube, population cube, and the base cube.

6. The method of claim 1 wherein steps receiving, generating and deriving are implemented by utilizing a OLAP programming.

7. The method of claim 1 wherein receiving comprises:
   receiving a first volume cube that represents the purchase volume of customers for a first region;
   receiving a second volume cube that represents the purchase volume of customers for a second region; and
   wherein generating comprises:
   generating an association cube, a population cube and a base cube based on the first volume cube and the second volume cube.

8. A data processing system comprising:
   a plurality of local stations ("LDOSs") having a local computation engine for mining and summarizing the local transaction data and for generating local customer profile cubes; and at least one global station ("GDOS"), coupled to the plurality of the local stations, the global station having a global computation engine for receiving the local customer profiles, merging and mining the local profile cubes, and generating global profile cubes and scoped association rules, the scoped association rules comprising a plurality of bases from distinct data sources and based on said local profile cubes, and providing the global profile cubes and the association rules to said plurality of LDOSs, wherein said local customer profile cubes and global profile cubes comprise multi-dimensional data structures that have elements comprising one or more aggregated dimensions and that are processed in a multidimensional database.

9. The system according to claim 8, wherein each of said plurality of LDOSs comprises a local data warehouse and at least one local OLAP server, the local data warehouse being adapted to receive and store said transaction data, wherein the local computation engine builds the local profile cubes that contains at least partial information regarding customer profiling by periodically mining new transactions flowing into said local data warehouse and deriving patterns for local analysis, said local computation engine also being adapted to incrementally update F said local profile cubes.

10. The system according to claim 9 wherein said local data warehouse receives and stores transaction data in a first predetermined interval and wherein said local OLAP engine generates said local profile cubes in a second predetermined interval.

11. The system according to claim 9 wherein said GDOS comprises a global data warehouse and at least one global OLAP server, the global data warehouse for receiving and storing the local profile cubes, the global computation engine for combining summary information from each of said LDOSs to build and incrementally update said global profile cubes and association rules, and for providing feedback to said plurality of LDOSs.

12. The system according to claim 11, wherein said local and global profile cubes comprise information of a plurality of customers, said information being derived from transaction data with said customers as stored by said local and global data warehouses, said profiling information specifying at least the following: kind, product, customer, merchant, time and area.

13. The system according to claim 12, wherein:

said local profile cubes are maintained at LDOS and said global profile cubes are maintained at GDOS, each of said local profile cubes being populated by mapping values in transaction data records into each dimension of said profile cube, each of said global profile cubes being retrieved and updated by merging appropriate local profile cubes.

14. The system according to claim 12, wherein said profile cubes are used to derive a plurality of shopping pattern cubes, said shopping pattern cubes comprising:

shopping behavior of at least one customer;
shopping patterns based on probability distribution;
shopping patterns based on volume.

15. The system according to claim 8, wherein said association rules comprise:

scoped association rule with different bases, each of the bases being said scoped association rule's population over which said scoped association rule is defined;

multidimensional association rule with "customer" being its base, products" being its item, and "merchant," "area" and "time" being underlying features of said multidimensional association rule; and multilevel association rule with its features being represented at multiple levels.

16. The system according to claim 15, wherein said association rules are mined by:

converting a volume cube into an association cube, a base cube and a population cube, said volume cube representing purchase volumes of customers dimensioned by item, base and feature;

deriving a support cube based on said base cube and said association cube; and deriving a confidence cube based on said association cube and said population cube.

17. A method of distributed data processing using on-line analytical processing ("OLAP") engines for use with transaction data in electronic commerce, comprising the steps of:

mining and summarizing, using a plurality of local servers ("LDOSs"), said transaction data to generate local profile cubes;

merging and mining, using at least one global server ("GDOS"), said local profile cubes received from said plurality of LDOSs to generate global profile cubes and scoped association rules based on said local profile cubes, wherein the scoped association rules comprise a plurality of bases from distinct data sources; and feeding back said global profile cubes and association rules from said GDOS to said plurality of LDOSs for their business applications, wherein said local profile cubes and global profile cubes comprise multi-dimensional data structures that have elements comprising one or more aggregated dimensions and that are processed in a multi-dimensional database.

18. The method according to claim 17, wherein the step of mining and summarizing, using LDOSs, comprises:

receiving and storing said transaction data using a local data warehouse, building, using a local OLAP engine, said local profile cubes containing at least partial information regarding customer profiling by periodically mining new transactions flowing into said local data warehouse and deriving patterns for local analysis; and incrementally updating said local profile cubes with the new transactions.

19. The method according to claim 18 wherein the step of receiving and storing is in a first predetermined interval and wherein the step of building said local profiles is in a second predetermined interval.

20. The method according to claim 18 wherein said step of receiving, merging and mining by using the GDOS comprises:

storing said local profile cubes using a global data warehouse;

combining using a global OLAP engine summary information from each of said LDOSs to build and incrementally update said global profile cubes and association rules; and feeding back said global profile cube and association rules.

21. The method according to claim 20 wherein said local and global profile cubes include information of a plurality of customers, said information being derived from transaction data with said customers as stored by said local and global data warehouses, said profiling information specifying at least the following: kind, product, customer, merchant, time and area.

22. The method according to claim 21 wherein said local profile cubes are maintained at LDOS and said global profile cubes are maintained at GDOS, each of said local profile cubes being populated by mapping values in transaction data records into each dimension of said profile cube, each of said global profile cubes being retrieved and updated by merging appropriate local profile cubes.

23. The method according to claim 21 wherein said profile cubes, are used to derive a plurality of shopping pattern cubes, said shopping pattern cubes comprising:
   shopping behavior of at least one customer;
   shopping patterns based on probability distribution;
   shopping patterns based on volume.

24. The method according to claim 17 wherein said association rules comprise:
   scoped associate rule with different bases, each of the bases being said scoped association rule's population over which said scoped association rule is defined;
   multidimensional association rule with "customer" being its base, "products" being its item, and "merchant," "area" and "time" being underlying features of said multidimensional association rule; and
   multilevel association rule with its features being represented at multiple levels.

25. The method according to claim 24, wherein said association rules are mined by:
   converting a volume cube into an association cube, a base cube and a population cube, said volume cube representing purchase volumes of customers dimensioned by item, base and feature;
   deriving a support cube based on said base cube and said association cube; and
   deriving a confidence cube based on said association cube and said population cube.

26. A computer-implemented method for generating association rules, comprising:
   in the processing system, generating scoped association cubes, a population cube and a base cube based on a volume cube that represents a purchase volume of customers, wherein the scoped association cubes comprise a plurality of bases from distinct data sources; and
   in the processing system, deriving a confidence cube and a support cube of an association rule based on the association cube, population cube, and the base cube.

27. The method of claim 26 wherein generating scoped association cubes, a population cube, and a base cube based on a volume cube comprises generating an association cube that has at least two levels and at least two dimensions.

28. A system, comprising:
   a plurality of local stations having a local computation engine for mining and summarizing the local transaction data and for generating local customer profile cubes; and
   at least one global station coupled to the plurality of the local stations, the global station having a global computation engine for receiving the local customer profiles, merging and mining the local profile cubes, and generating global profile cubes and scoped association rules, the scoped association rules comprising a plurality of bases from distinct data sources and based on said local profile cubes.

29. The system of claim 28 wherein the local and global stations comprise computer servers adapted to perform aggregations on the local customer profile cubes.

* * * * *

UNITED STATES PATENT AND TRADEMARK OFFICE
CERTIFICATE OF CORRECTION

PATENT NO. : 7,007,020 B1
APPLICATION NO. : 09/524140
DATED : February 28, 2006
INVENTOR(S) : Qiming Chen et al.

It is certified that error appears in the above-identified patent and that said Letters Patent is hereby corrected as shown below:

In column 2, line 33, delete "arid" and insert -- and --, therefor.

In column 5, line 42, insert -- and -- before "feed".

In column 12, line 29, delete "X^Y," and insert -- X$\Lambda$Y, --, therefor.

In column 12, line 32, delete "0^C$_v$" and insert -- 0$\Lambda$C$_v$ --, therefor.

In column 12, line 41, delete "C$_\alpha$" and insert -- C$_a$ --, therefor.

In column 12, line 46, delete "X^Y" and insert -- X$\Lambda$Y --, therefor.

In column 12, line 47, delete "C$_\alpha$" and insert -- C$_a$ --, therefor.

In column 13, line 24, delete "NumOJBuyers" and insert -- NumOfBuyers --, therefor.

In column 13, lines 27-28, delete "customer roup" and insert -- customer_group --, therefor.

In column 13, line 32, delete "NumOJShoppers" and insert -- NumOfShoppers --, therefor.

In column 13, line 33, delete "NumOJShoppers" and insert -- NumOfShoppers --, therefor.

In column 13, line 38, delete "C$_\alpha$" and insert -- C$_a$ --, therefor.

In column 13, line 39, delete "C$_\alpha$" and insert -- C$_a$ --, therefor.

In column 17, line 6, delete "pi" and insert -- p$_1$ --, therefor.

In column 17, line 11, delete "productpl, time t," and insert -- product p$_1$, time t$_1$ --, therefor.

In column 17, line 27, delete "$\alpha$_month+1" and insert -- a_month+1 --, therefor.

In column 17, line 31, delete "$\alpha$_year" and insert -- a_year --, therefor.

In column 17, line 32, delete "$\alpha$_Year" and insert -- a_year --, therefor.

In column 18, line 62, delete "C$_{\alpha,i}$" and insert -- C$_{a,i}$ --, therefor.

In column 19, line 13, delete "$\alpha_l, ..., \alpha_k$," and insert -- $a_l, ..., a_k$, --, therefor.

In column 19, line 13, delete "$\alpha$" and insert -- a --, therefor.

In column 19, line 16, delete "$\alpha_l,\ldots,\alpha_k$" and insert -- $\alpha_l,\ldots,\alpha_k$ --, therefor.

In column 20, line 26, in Claim 3, delete "th" and insert -- the --, therefor.

In column 21, line 15, in Claim 8, delete "multidimensional" and insert -- multi-dimensional --, therefor.

In column 21, line 27, in Claim 9, after "update" delete "F".

In column 22, line 5, in Claim 15, delete "products"" and insert -- "products" --, therefor.

In column 23, line 14, in Claim 23, delete "cubes," and insert -- cubes --, therefor.

In column 24, line 6, in Claim 26, delete "the" and insert -- a --, therefor.

Signed and Sealed this

Thirtieth Day of March, 2010

David J. Kappos
*Director of the United States Patent and Trademark Office*